United States Patent [19]

Hoff, Jr.

[11] 3,810,127

[45] May 7, 1974

[54] PROGRAMMABLE CIRCUIT — THE METHOD OF PROGRAMMING THEREOF AND THE DEVICES SO PROGRAMMED

[75] Inventor: Marcian Edward Hoff, Jr., Mountain View, Calif.

[73] Assignee: Intel Corporation, Mountain View, Calif.

[22] Filed: June 29, 1972

[21] Appl. No.: 267,637

Related U.S. Application Data

[63] Continuation of Ser. No. 49,097, June 23, 1970, abandoned.

[52] U.S. Cl. ........ 340/173 SP, 340/173 R, 307/238

[51] Int. Cl. ............................................ G11c 11/40

[58] Field of Search ........ 340/173 SP; 307/238, 279

[56] References Cited

UNITED STATES PATENTS

| | | | |
|---|---|---|---|
| 3,245,051 | 4/1966 | Robb | 340/173 R |
| 3,576,549 | 4/1971 | Hess | 340/173 R |
| 3,611,319 | 10/1971 | Hyatt | 340/173 R |
| 3,691,631 | 9/1972 | Bhola | 340/173 R |
| 3,529,299 | 9/1970 | Chung | 340/173 R |

*Primary Examiner*—Terrell W. Fears

[57] ABSTRACT

A programmable circuit, a method of programming and the devices so programmed wherein a conductive spike is created to eliminate the potential difference across a P-N junction (e.g. by creating a continuous metal bridge across the P-N junction). The spike is created by the application of a pulse of current through the P-N junction.

19 Claims, 10 Drawing Figures

MARCIAN EDWARD HOFF, JR.
INVENTOR.

BY Spensley, Horn & Lubitz
ATTORNEYS

MARCIAN EDWARD HOFF, JR.
INVENTOR.

BY Spensley, Horn & Lubitz
ATTORNEYS

PROGRAMMABLE CIRCUIT — THE METHOD OF PROGRAMMING THEREOF AND THE DEVICES SO PROGRAMMED

This is a continuation of application Ser. No. 49,097, filed June 23, 1970 now abandoned.

BACKGROUND OF THE INVENTION

1. Field of the Invention

This invention relates to the field of programmable circuits.

2. Prior Art

In a number of applications it is desired to have a circuit which may be permanently electronically altered. Typical examples are in computer memories where it is desired to permanently place certain information into the memory at some time subsequent to the fabrication of the memory. For instance, missiles may be built and deployed without knowledge of the eventual target for the missile. However, once the target is determined it may be desired to permanently alter a memory within the guidance system computer so as to permanently store the target coordinates. Other memory means such as flip-flop memories or magnetic memories are not suitable for this application since they may be subsequently inadvertently altered by such occurrences as a temporary loss in electrical power.

Another application where it may be desired to have a permanently alterable memory is in a digital computer which is to be used in conjunction with one or more analog devices. Analog devices characteristically require relatively large and/or relatively expensive components for the adjusting of such things as scale factors and biases. In some applications a less expensive and/or smaller package may be achieved if the analog devices are not accurately adjusted and such lack of adjustment is compensated for by permanently altering a memory within the digital computer after the computer and the analog devices are mated.

Another application where a permanently alterable memory may be highly advantageous is in special purpose digital computers. Rather than to build a different special purpose computer for each different application, it may be less expensive and easier to build general purpose computers of one design using permanently alterable memories. Each computer could later be permanently programmed for the desired special purpose thereby allowing high volume production of one fixed design even though each computer so produced will later be adapted to a specific use.

Permanently alterable memories have been built in the past using a semiconductor diode or a pair of semiconductor diodes in a back-to-back configuration. Typically such circuits are altered by changing a diode from a uni-directional conducting device to a bi-directional conducting device by passing a current through the diode junction in a reverse bias direction. This current in the reverse direction causes severe heating in the P-N junction and results in a permanent destruction of the P-N junction characteristic. The resulting device is similar in characteristics to a resistor where the resistance is approximately equal to the combined resistance of the P and the N regions. Consequently, by the application of a relatively large current pulse, the diode may be effectively changed to a resistor having a substantial resistance.

BRIEF SUMMARY OF THE INVENTION

A semiconductor diode of a suitable design and having a P-N junction with metallic leads, may be permanently shorted out by forming a metallic bridge between the semiconductor junction when a suitable current pulse is passed through the P-N junction. This current pulse causes severe heating in the P-N junction which in turn causes a metallic lead or leads to partially melt and to flow across the junction. When the bridge subsequently cools, a permanent metallic bridge across the junction (and probably between the two diode leads) results. This metallic bridge is generally formed beneath the protective coating on the semiconductor body and provides a low resistance conduction path over the device junction.

Diodes with the capability of being shorted out as described above and/or diodes so shorted out may be used as part of a programmed memory circuit. Though such a memory circuit normally consists of a matrix of back-to-back diode pairs, diodes such as the diodes of the present invention may also be used as a diode-transistor combination rather than as diode pairs. Such an arrangement allows the permanent shorting out of the diodes by a relatively low power current pulse applied to the transistor base. In addition, the required current pulse may also be reduced by a unique diode design which concentrates the heating in a narrow band near the surface of the diode.

DETAILED DESCRIPTION OF THE INVENTION

Figure 1:
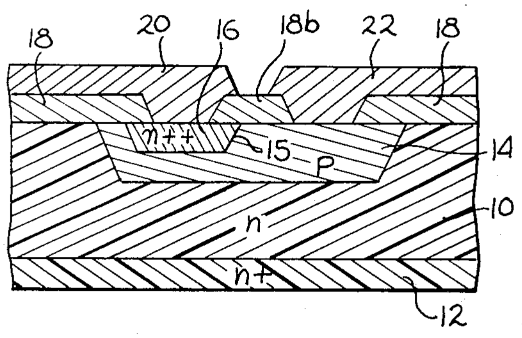
FIG. 1 is a cross-section of a diode designed in accordance with the present invention.

FIG. 1 shows a cross-section of a semiconductor diode using the emitter-base diode of a monolithic transistor. The principles of the present invention are applicable to diodes of other constructions, and may be easily applied to diodes of other constructions by anyone skilled in the semiconductor art. However, the specific construction shown in FIG. 1 was chosen for purposes of explanation because of its suitability for use in specific memory circuit subsequently described and shown in FIGS. 5, 6 and 7.

The diode of FIG. 1 is formed on a semiconductor chip of relatively high resistance N-type silicon. The inner portion of the chip remains unaltered and forms region 10 of the diode. On one side of the silicon chip an N-type impurity is diffused into the chip over the entire surface. This lowers the resistance of region 12 and provides a surface to which electrical contact may easily be made. In a selected area of the outer surface of the chip a P-type impurity has been diffused into the silicon wafer, thereby forming a P-conductivity type region 14. On a selected area of this P-type region an N-type impurity is subsequently diffused, thereby forming N-conductivity type region 16. A silicon oxide lauer is then grown over the entire upper surface of the semiconductor wafer. Finally, selected areas of the silicon oxide are etched away, leaving oxide coated areas 18 and **18*b*, and aluminum is thereafter selectively deposited to this surface thereby forming aluminum contacts 20 and 22**.

An N-type conductivity region has an excess of electrons in the crystal structure and the conduction within such a region is due to the drift of the electrons under the influence of an applied electric field. A P-type semiconductor region is characterized by a deficiency of electrons in the crystal structure. Because of this deficiency there is a positive charge at each location within the crystal where an electron is missing. These positive charges are commonly referred to as "holes" and electrical conduction in a P-region is due to a drift of these holes under the influence of an electric field.

Region 12 of the diode shown in FIG. 1 would normally be connected to the positive supply voltage for the circuit. Consequently, aluminum contact 22 and P-region 14 may never be at a higher voltage than region 12, and normally will be at a voltage substantially below that of regions 12 and 10. As a result, region 10 will be at a higher voltage than region 14 and both the holes in region 14 and the excess electrons in region 10 will be displaced away from the P-N junction between regions 10 and 14 by the difference in the voltage between the two regions, thereby forming a depletion layer between the two regions and effectively electrically isolating region 14 from both regions 10 and 12.

When contact 20 is at a higher voltage than contact 22, N-type region 16 will be at a higher voltage than P-type region 14. The higher voltage on region 16 attracts the excess electrons in region 16 away from the P-N junction 15 between regions 16 and 14. Similarly, the lower voltage on region 14 attracts the holes in region 14 away from the P-N junction 15 between the two regions, thereby forming a depletion layer at the P-N junction 15. Consequently, the two regions are essentially electrically isolated from each other when contact 20 is at a higher voltage than contact 22. On the other hand, when contact 20 is at a lower voltage than contact 22 region 16 will be at a lower voltage than region 14. The electrons in region 16 will be driven toward the P-N junction 15 as will holes in region 14. At the P-N junction 15 the electrons coming from region 16 fill the holes coming from region 14, thereby making way for a continuous flow of electrons from region 16 and a continuous flow of holes from region 14. Consequently, in normal operation, current may flow from region 22 through regions 14, 16 and 20 when region 22 is at a higher voltage than region 20, but no current may flow, other than a slight leakage current, when contact 20 is at a higher voltage than contact 22. Thus, the desired diode characteristic has been obtained.

In the prior art programmable circuits using diodes, a voltage would be applied in the reverse direction across the diode of sufficient magnitude to cause electrical breakdown across the junction and a reasonably high current to flow across the diode. Since most of the voltage drop occurred in the junction region, a large amount of heat would be dissipated at the junction, thereby causing permanent destruction of the P-N junction characteristic. The resulting device would have a resistance approximately equal to the sum of the resistances of the N-region and the P-region.

Figure 2:
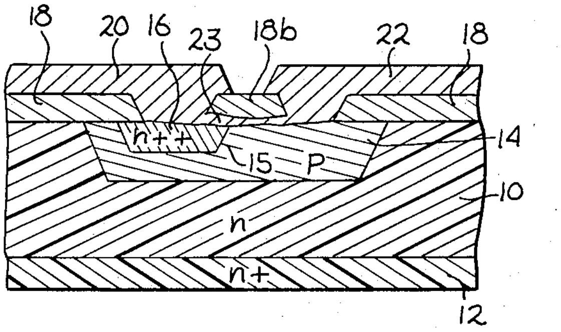
FIG. 2 is a cross-section of the diode of FIG. 1 showing the metallic bridge across the device junction.

By proper design of the diode, proper selection of the contact material for contact 20 and 22 and a proper current pulse for destroying the diode, the resulting device shown in FIG. 2 may be achieved. The heating of the junction due to the current pulse, normally in reverse direction, causes either or both of the contacts 20 and 22 to partially melt and flow together so as to form a metallic bridge or spike 23 between the P-N junction 15 and if desired between the contacts 20 and 22. It is believed that normally this bridge is created on the surface of the semiconductor under the oxide coating **18*b* and appears as a narrow or spike conductor between the junction 15 and/or between the contacts 20 and 22. Though the mechanism which causes these spikes to form is not yet fully understood, apparently, the heating of the junction causes the contacts 20 and/or 22 to alloy with the silicon. This alloy has a lower melting point than either the aluminum or silicon. The resulting alloy melts and runs under the oxide coating 18*b* in spikes, perhaps due to the electrostatic forces between the two contacts or due to the manner in which the heating of the junction is localized when the metal of either or both of the contacts starts to flow. Whatever the true mechanism is, the net result of the current pulse through the diode in the reverse direction is a continuous low resistance metallic path between the junction 15 and/or the contacts 20 and 22**; this resistance being substantially less than the resistance obtained by the mere destruction of the P-N junction as in the prior art devices and methods.

To achieve the above beneficial results the following factors must be considered. The diode contacts 20 and 22 must be located by design sufficiently close together so that an unreasonably long spike need not be formed. The material for contacts 20 and 22 should be chosen so as to not have an unreasonably high melting temperature, and ideally should alloy with the silicon. The current pulse must be of adequate magnitude and duration to cause sufficient heating to partially melt either or both of the contacts 20 and 22 and to form the spike between the device junction and/or contacts, but should be terminated shortly thereafter. For one particular diode construction, the desired spikes were obtained using aluminum as the material for contacts 20 and 22, separated by a distance of approximately, a current pulse of approximately 400 milliamps, and a voltage of approximately 16 volts. The current pulse may be of a predetermined duration on the order of a few hundred microseconds or may be applieied until the diode terminal voltage falls, thereby indicating the creation of the conduction spikes 23.

Figure 3:
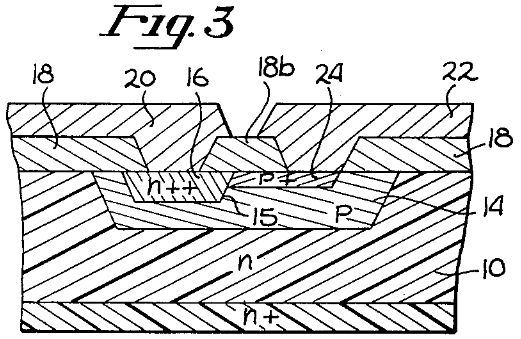
FIG. 3 is a cross-section of a diode with a P+ region to enhance the formation of the metallic bridge.

FIG. 3 shows a cross-section of a diode very similar in construction to the diode shown in FIG. 1. However, a P+ region 24 has been added. This region is similar to the P− region 14 but is doped and has a higher concentration of holes than region 14. Region 24 is a relatively thin and narrow region at the surface of the semiconductor running from contact 22 to region 16. The effect of region 24 is to concentrate the heating caused by the current pulse in a narrow band at the surface of the semiconductor thereby enhancing the tendency to form the conduction spikes. It also lowers the series resistance of the device prior to spike formation, and the breakdown voltage of the diode. It has been found in practice that the addition of region 24 reduces the magnitude of the current pulse required to form the spikes by approximately 50 percent.

Figure 4:
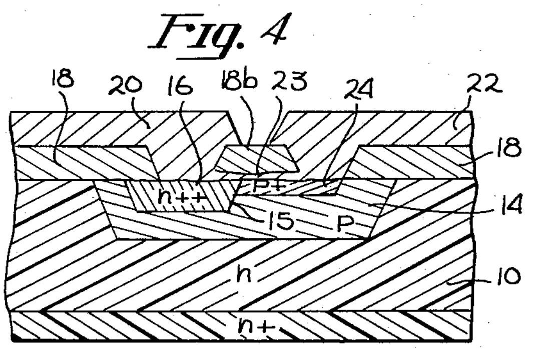
FIG. 4 is a cross-section of the diode of FIG. 3 showing the metallic bridge over the device junction.

FIG. 4 is a cross section of the diode of FIG. 3 showing the conduction spike 23 created by the current pulse. The addition of region 24 does not substantially change the nature of the conduction spikes formed, but merely reduces the current required to form the spikes.

Figures 5, 7:
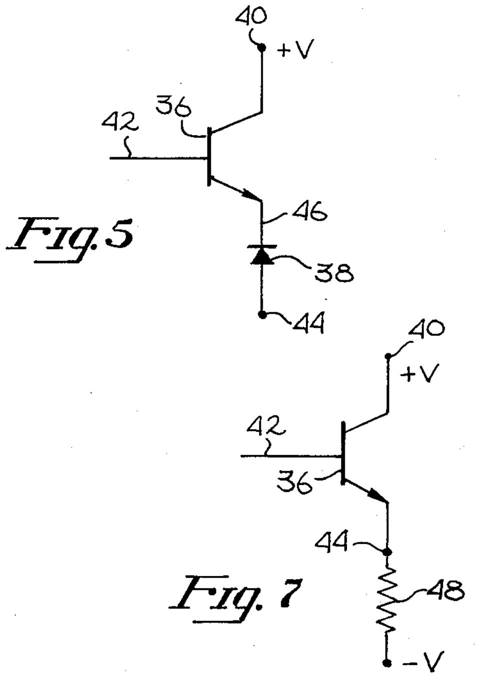
FIG. 5 shows another embodiment of the present invention consisting of a transistor-diode circuit.
FIG. 7 shows the embodiment of FIG. 5, after programming, connected as in FIG. 6 to serve as a memory means to store a "1" state.

FIG. 5 shows an element of a memory circuit comprised of a transistor 36 and a diode 38. In this circuit, diode 38 may be an ordinary diode, a diode of the construction shown in FIG. 1 or a diode of the construction shown in FIG. 3. For purposes of programming, a power supply is used with a terminal voltage exceeding the reverse bias breakdown voltage of the diode. Point 40 will be connected to the positive terminal of the power supply and point 44 will be connected to the negative terminal. Thus, a signal applied at point 42 will turn on transistor 36, thereby causing a high reverse current in diode 38 and destroying the diode, either by the destruction of the P-N junction or by the creation of the spike conductors. The advantage of this circuit over a pair of back-to-back diodes is that, because signal 42 is amplified by transistor 36, the power required in signal 42 is much less than that required to destroy diode 38, the difference being equal to the gain of the transistor 36.

The circuit may be programmed to have either one of two states, the first state being with diode 38 operative as a diode (i.e. no programming of the memory element being required) and the second state being with diode 38 destroyed as previously described. For purposes of discussion, these states shall be referred to as the "0" state and the "1" state, respectively.

Figure 6:
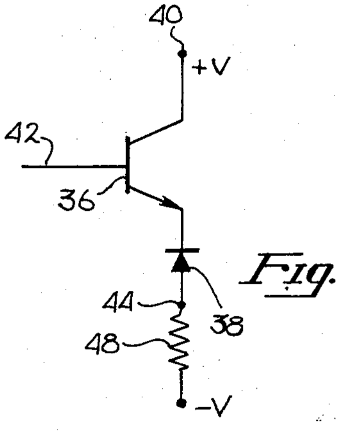
FIG. 6 shows the embodiment of FIG. 5 as it could be connected to serve as a memory means to store a "0" state.

To read the state of the circuit, point 44 is resistively coupled (shown as resistor 48 in FIGS. 6 and 7) to the low voltage supply of the memory, and a read signal of a voltage approximately equal to the high voltage of the memory supply is applied at point 42 (the memory power supply, unlike the supply used for programming, should have a terminal voltage below the reverse bias breakdown voltage of the operative diodes). Although this will turn on transistor 36, the resulting voltage at point 44 will depend on the condition of diode 38. If the diode is operative as a diode, as shown in FIG. 6, it will be biased in the non-conducting direction. Consequently, there will be no current flow through the diode or through the resistor 48 and point 44 will remain at the low voltage of memory supply, thus indicating a "0" state. However, if diode 38 has been destroyed as previously described, and therefore, is inoperative, the circuit will be effectively shown in FIG. 7. Here the diode resistance as destroyed is assumed to be negligible compared to the value of resistor 48. In this condition a read signal 42 turns on transistor 36, essentially connecting point 44 to the high voltage supply 40 of the memory; the memory supply voltage occurring as a voltage drop across resistor 48. Now voltage 44 is at high voltage 40 of the memory and represents the "1" state. Consequently, whether a "0" or a "1" has been stored in this memory element depends on whether the diode is operative as a diode or has been destroyed.

The advantage of this circuit over a diode or a pair of back-to-back diodes is that the circuit is easier both to program and to read. As was previously described, the gain of the transistor 36 greatly reduces the power required in signal 42 to destroy the diode 38 when the circuit is being programmed. In addition, when the circuit content is being read, the power required in signal 42 to create an output at point 44 equivalent to the "1" state is also greatly reduced due to the gain of transistor 36. This reduces or eliminates the need for amplification of the output signal of the memory prior to its use for its intended purpose.

It is to be understood that the preferred embodiment of the present invention is that shown in FIGS. 5, 6 and 7; that is, with the N-region of the semiconductor diode connected to the emitter of an NPN transistor. However, similar results may be obtained by using a PNP transistor or by connecting the diode to the collector of the transistor. By way of example, circuits may readily use an NPN transistor with the P-region of the diode connected to the collector of the transistor, or by using a PNP transistor with the P-region of the diode connected to the emitter of the transistor or with the N-region of the diode connected to the collector of the transistor. The common characteristic of these connections is that the transistor and diode are connected in series with the normal direction of current flow through the transistor being opposite that of the diode. Such circuits may readily be designed and used by one skilled in the art.

Figure 8:
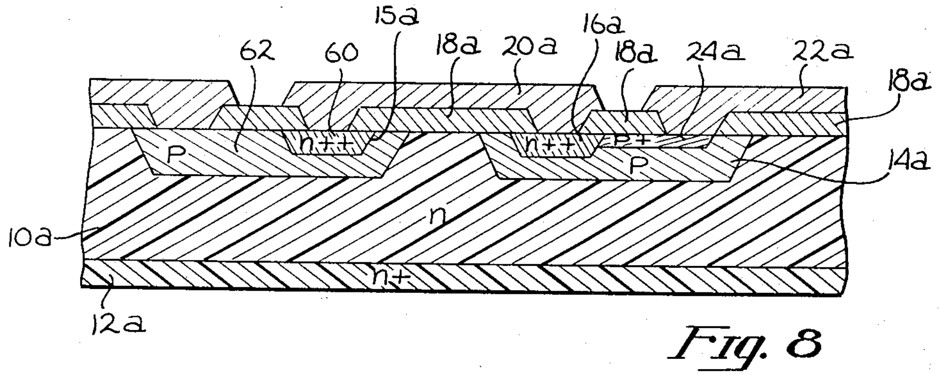
FIG. 8 shows a cross-section of a monolithic diode-transistor combination as shown schematically in FIG. 5.

FIG. 8 is a cross-section of a monolithic diode transistor combination as was shown schematically in FIG. 5 and previously described. The diode portion of this combination is the same as the diode shown in FIG. 3 with the identifying numbers of FIG. 3, followed with an (a), being used for identification in FIG. 8. The transistor portion consists of an N-type emitter region 60, a P-type base region 62 and a collector region 10. (Region 10 also serves to electrically isolate the diode as previously described in the explanation of FIG. 1). Here the base region 62 is used to control the current flow from region 10 to region 60.

FIG. 8 is the preferred embodiment for the present invention. The diode and the transistor are created on a common chip, which may contain large numbers of such diode-transistor combinations and/or other associated circuitry. In this manner, a memory of substantial capacity may be formed on a single semiconductor chip. The diode contains the P+ region 24*a* which serves to reduce the current required to form the conduction spikes between the P-N junction and/or between contacts 20*a* and 22*a*. This, together with the gain of the transistor, minimizes the power required in the signal to contact 42 (contacting the base region of the transistor), to program the circuit. In addition, the transistor also amplifies the read signal applied to contact 42, thereby substantially reducing the power required in a read signal and/or increasing the power available at the memory output 44. This minimizes or aleviates the requirement for amplification of either the read signal or the memory output signal. However, it is to be understood that the present invention is not limited to the devices of this construction. In its broadest sense, the diode may be of any construction, provided it is designed with the considerations previously discussed, so that it may be shorted out by the formation of the spike conductors. Such a device may be used in any diode memory or in a diode memory comprised of a transistor-diode combination as in FIG. 5, whether the diode and the transistor are discrete components or are formed on a common semiconductor wafer as shown in FIG. 8. In addition, because of the effects of the gain of the transistor previously described, a memory element comprised of a transistor and ordinary diode combination connected as shown in FIG. 5, also may be used as a memory means. Such a combination is programmed in the same manner. However, in this case, the P-N junction of the diode is not shorted out by the spike conductor, but instead the P-N junction is destroyed by the excessive heating of the current pulse. The disadvantage of using a diode of ordinary construction is that the resistance of the diode, as destroyed, is considerably higher than the resistance of the spike conductors formed in the diodes of the present invention.

Figure 9:
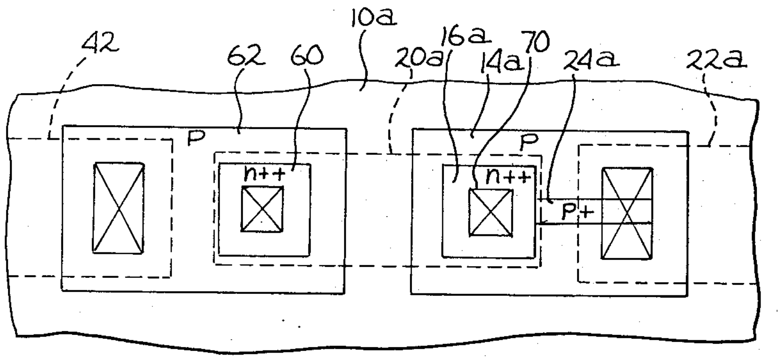
FIG. 9 shows a top view of a monolithic diode-transistor combination as shown schematically in FIG. 5.

FIG. 9 is a top view of the devices of FIG. 8. In this figure, the regions bounded by solid lines are the regions that would be visible by a section taken along line 9—9 of FIG. 8. The regions outlined by the broken lines are the aluminum contacts **42, 20*a* and 22*a* as viewed from the top of FIG. 8. The areas containing an "X" indicate the area of contact between the aluminum contacts and the respective areas of the semiconductor devices. It can be seen from this figure that the aluminum contacts contact only a central area of a particular semiconductor region. As an example, aluminum contact 20*a* contacts region 16*a* only over area 70.**

This figure also shows the relative width of the P+ region **24*a* with respect to the width of the other regions. This region is a narrow and shallow strip extending from the area of the contact of contact 22a** to the P-N junction and serves to concentrate the heating in the diode to a narrow strip located near the surface of the semiconductor, as previously described.

Figure 10:
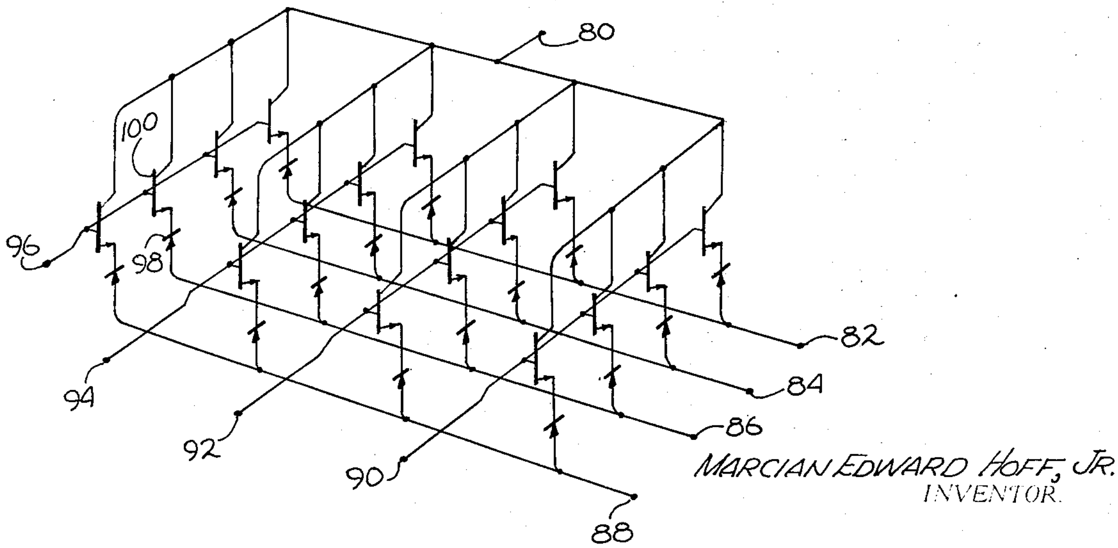
FIG. 10 shows a matrix of diode-transistor elements that may be used as a programmable memory.

FIG. 10 shows a matrix of diode-transistor elements that may be used as a programmable memory. Such a matrix may be programmed to have a large variety of conductive states. Also, though the matrix shown consists of sixteen memory elements (e.g. diode-transistor combinations) it is to be understood that memories of any (large) capacity may be created by changing (increasing) the number of individual memory elements as desired. In the preferred embodiment, many memory elements of the construction shown in FIGS. 8 and 9 are formed on a single semiconductor chip using techniques well known in the art of semiconductor integrated circuit manufacture. In this manner, a memory of substantial capacity, complete with the circuit interconnections shown in FIG. 10, may be fabricated on a single semiconductor chip. By way of example, the content of the memory element comprised of diode 98 and transistor 100 may be read by energizing line 96 and sensing the voltage on line 86. A voltage on line 86 substantially equal to the low voltage of the memory power supply corresponds to a "0" state and indicates that the diode is still operative. A voltage on line 86 which is very near the high voltage of the memory supply corresponds to a "1" state and indicates that the diode has been programmed by destroying or shorting out the diode. Thus, it can be seen that each memory element in the matrix, prior to programming contains a logical "0" and that the matrix may be programmed for any of a large number of states by programming the appropriate memory elements to permanently contain the logical "1." Still larger memories may be fabricated using multiplicity of such chips.

The matrix shown in FIG. 10 may be programmed (permanently altered) as follows. Line 80 is first connected to a source of electrical power having a terminal voltage a predetermined amount higher than the reverse bias breakdown voltage of the diodes (but not higher than the breakdown voltage of the transistors). Then any diode may be destroyed (or rendered inoperative) by connecting the appropriate line of lines 82 through 88 to the low voltage terminal of the source of electrical power and applying a signal on the appropriate line of lines 90 through 96. By way of example, diode 98 may be destroyed by connecting line 86 to the low voltage terminal of the source of electrical power and applying a pulse signal to line 96 to turn on transistor 100. The pulse signal should have a short rise time and a short fall time to quickly change the transistor from the off state to the on state and vice versa, thereby minimizing the power dissipation in transistor 100 by minimizing the time during which there is both a substantial current through the transistor and a substantial voltage drop across the transistor.

In use as a memory, line 80 is connected to the high voltage terminal of the memory power supply, and lines 82 through 88 are each connected through a resistor to the low voltage terminal of the memory power supply. This power supply should have a voltage which is less than the reverse breakdown of the diodes thereby being inadequate to inadvertently program the memory. Now the content (conduction state) of any memory element may be read by energizing the appropriate line of lines 90 through 96 so as to turn on the corresponding row of transistors and sensing the output of the appropriate line of lines 82 through 88.

I claim:

1. A silicon semiconductor diode having a P-region and an N-region, said regions being separated by a P-N junction, a first electrical contact made to said P-region by a layer of metal to an area of said P-region and a second electrical contact made to said N-region by a layer of metal to an area of said N-region, said semiconductor diode being protected by at least one more protective coating over the surface of the otherwise exposed semiconductor diode wherein the distance between said electrical contacts is predetermined with respect to each other that upon the passage of a given current pulse through the P-N junction in the reverse direction, said electrical contacts may be caused to melt and to flow thereby forming upon solidification a permanent metallic bridge between said P-N junction.

2. The diode of claim 1 wherein the electrical contacts are aluminum.

3. The diode of claim 2 wherein said P-region is comprised of a first P-region and a second P-region, said second P-region being more heavily doped and of a substantially higher conductivity than said first P-region and further being substantially localized to the surface of said semiconductor diode is a relatively narrow strip extending from said electrical contact for said first P-region to said P-N junction.

4. A semiconductor diode on an N-type semiconductor wafer with a P-region formed by the diffusion of a P-type impurity into said wafer in a selected area of said wafer and a second N-region formed on the surface of said P-type region by the diffusion of an N-type impurity into a selected area of said P-region, thereby forming a P-N junction between said P-region and said second N-region, electrical contact made to said N-type wafer by a first layer of metal, electrical contact made to said P-region by a second layer of metal to an area of said P-region, electrical contact made to said second N-region by a third layer of metal to an area of said second N-region, said semiconductor diode being protected by at least one protective coating over the surface of the otherwise exposed semiconductor diode, wherein said second layer of metal and said third layer of metal are so arranged with respect to each other than upon the passage of a current pulse through the P-N junction in the reverse direction, said electrical contacts may be caused to melt and to flow thereby forming, upon solidification, a permanent metallic bridge between said P-N junction.

5. The diode of claim 4 wherein the N-type wafer has a N+ layer formed on the surface of said N-type wafer opposite the surface on which the P-N junction was formed, said N+ layer being located between said N-type wafer and said deposited first layer of metal.

6. A method of rendering a semiconductor diode inoperable by the formation of a conductive bridge between the P and the N regions of said diode, each region having a metallic electrical contact thereto, comprised of the steps of:

a. passing a current pulse through said semiconductor diode in the reverse direction, said current pulse being of a predetermined amplitude and duration to cause partial melting and the flowing of said electrical contacts; and
b. allowing said partially melted and joined contacts to cool and solidify.

7. A method of rendering a semiconductor diode inoperable by the formation of a metallic bridge between the P and the N regions of said diode, each region having a metallic electrical contact thereto, comprised of the steps of:

a. initiating a current pulse of a predetermined amplitude through said semiconductor diode in the reverse direction to cause partial melting and the flowing of said electrical contacts;
b. terminating said current pulse at a time determined by the drop in the apparent diode resistance when said contacts flow; and,
c. allowing said partially melted and joined contacts to cool and solidify.

8. A programmable memory cell comprised of a transistor having an emitter, a base and a collector and a semiconductor diode containing a P-region, an N-region and a P-N junction, said diode being coupled to one of said emitter and said collector of said transistor so that current in the reverse direction through said diode may be controlled by the voltage on said base, said transistor having a sufficient current carrying capacity to conduct current sufficient to destructively effect said diode.

9. The memory element of claim 8 wherein said transistor is a NPN transistor and said N-region of said diode is electrically connected to said emitter of said transistor.

10. The memory element of claim 9 wherein said semiconductor diode has a P-region and an N-region, said regions being separated by a P-N junction, a first electrical contact made to said P-region by a layer of aluminum to an area of said P-region and a second electrical contact made to said N-region by a layer of aluminum to an area of said N-region, said semiconductor diode being protected by at least one more protective coating over the surface of the otherwise exposed semiconductor diode wherein the distance between said electrical contacts is predetermined with respect to each other that upon the passage of a given current pulse through the P-N junction in the reverse direction, said electrical contacts may be caused to melt and to flow thereby forming upon solidification a permanent metallic bridge between said P-N junction, and said semiconductor diode and said transistor are of monolithic construction.

11. A circuit element comprised of a P-type semiconductor region and an N-type semiconductor region, an electrical contact formed by a layer of metal to an area of said P-type region, a second electrical contact formed by a layer of metal to an area of said N-type region, and at least one protective coating over the surface of the otherwise exposed semiconductor diode, said P type and N type regions being electrically connected by a conductive bridge on the surface of said semiconductor regions formed by the melting and flowing of said contacts.

12. The circuit element of claim 11 wherein said P-region is comprised of a first P-region and a second P-region, said second P-region being more heavily doped and of substantially higher conductivity than said first P-region and further being substantially localized to the surface of said first P-region in a relatively narrow strip extending from said electrical contact for said first P-region to said N-region.

13. A circuit comprised of the circuit element of claim 11 disposed in the same body of semiconductor material and connected in series with a NPN transistor having an emitter, a base and a collector, said electrical contact to said N-region of said circuit element being electrically coupled to said emitter of said transistor.

14. A circuit comprised of the circuit element of claim 12 disposed in the same body of semiconductor material and connected in series with a NPN transistor having an emitter, a base and a collector, said electrical contact to said N-region of said circuit element being electrically connected to said emitter of said transistor.

15. A programmable memory circuit comprised of a transistor having an emitter, a base and a collector and at least one P-N junction, said P-N junction being coupled to one of said emitter and said collector of said transistor so that current in the reverse direction through said P-N junction may be controlled by the voltage on said base, said transistor having a sufficient current carrying capacity to conduct current sufficient to destructively effect said P-N junction.

16. A method of programming a programmable memory comprising a transistor having an emitter, a base and a collector, and at least one P-N junction, comprising the steps of:

a. coupling said P-N junction to one of said emitter and said collector of said transistor and coupling said transistor and P-N junction to a source of electrical power so that current in the reverse direction through said P-N junction may be controlled by the voltage on said base; and b. applying at least one control pulse to said base to cause at least one current pulse in the reverse direction through said P-N junction to destructively alter said junction.

17. A programmable memory circuit comprised of a transistor having an emitter, a base and a collector and at least one P-N junction having rectifying characteristics, said P-N junction being coupled to said to said transistor so that current may be caused to flow through said emitter and said collector of said transistor and in the reverse direction through said P-N junction, said transistor having a sufficient current carrying capacity to conduct current sufficient to destructively effect said P-N junction.

18. The memory circuit of claim 17 wherein said P-N junction is between a P-region and an N-region, at least one of said regions having metal contact thereto electrically coupled in series with said P-N junction, whereby the rectifying characteristics of said P-N junction may be destructively effected, at least in part, by the partial migration of said metal contact.

19. A method of programming a programmable memory comprising a transistor having an emitter, a base and a collector, and at least one P-N junction, comprising the steps of:

a. coupling said P-N junction to said transistor and coupling said transistor and P-N junction to a source of electrical power so that current may be caused to flow through said emitter and said collector and in the reverse direction through said P-N junction; and b. applying at least one control pulse to cause at least one current pulse in the reverse direction through said P-N junction to destructively alter said junction.

* * * * *